(12) United States Patent
Öhman et al.

(10) Patent No.: US 11,712,969 B2
(45) Date of Patent: Aug. 1, 2023

(54) CURRENT COLLECTOR DEVICE FOR A VEHICLE

(71) Applicant: VOLVO TRUCK CORPORATION, Gothenburg (SE)

(72) Inventors: Mikaela Öhman, Gothenburg (SE); Sten Engström, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 832 days.

(21) Appl. No.: 16/348,288

(22) PCT Filed: Nov. 10, 2016

(86) PCT No.: PCT/EP2016/077204
§ 371 (c)(1),
(2) Date: May 8, 2019

(87) PCT Pub. No.: WO2018/086689
PCT Pub. Date: May 17, 2018

(65) Prior Publication Data
US 2019/0263267 A1   Aug. 29, 2019

(51) Int. Cl.
*B60L 5/38* (2006.01)
*B60L 5/04* (2006.01)
(Continued)

(52) U.S. Cl.
CPC ............... *B60L 5/38* (2013.01); *B60L 5/00* (2013.01); *B60L 5/04* (2013.01); *B60L 5/18* (2013.01); *B60L 2200/40* (2013.01)

(58) Field of Classification Search
CPC ...... B60L 5/00; B60L 5/04; B60L 5/08; B60L 5/10; B60L 5/12; B60L 5/14; B60L 5/16;
(Continued)

(56) References Cited

U.S. PATENT DOCUMENTS 3,740,498 A   6/1973 Herbert
3,786,762 A * 1/1974 Corkum .................... B60L 5/38
                                                    104/288

(Continued)

FOREIGN PATENT DOCUMENTS

CN   101092114 A   12/2007
CN   103640484 A    3/2014
(Continued)

OTHER PUBLICATIONS

European Communication pursuant to Article 94(3) dated Jul. 14, 2020 in corresponding European Application No. 16794603.7, 6 pages.
(Continued)

*Primary Examiner* — S. Joseph Morano
*Assistant Examiner* — Cheng Lin
(74) *Attorney, Agent, or Firm* — Venable LLP; Jeffri A. Kaminski (57) ABSTRACT

The present invention relates to a current collector device (420) arranged mounting on a vehicle (100) to transmit electric power between current conductors (140) located in the surface of a road (110) and the vehicle (100). The current collector device (420) comprises, a first and second elongated current collector arm (150a, 150b) that are in operable connection with a base (170), the first and second elongated current collector arms (150a, 150b) are spaced apart from each other, and a first and second current collector pick-up heads (161, 162) are attached to the first and second elongated current collector arms (150a, 150b), respectively, and the elongated current collector arms (150a, 150b) are made of conducting material and arranged to conduct electrical current from conductors (140) located in the 10 surface of a road (110) and the vehicle (100).

11 Claims, 7 Drawing Sheets

(51) Int. Cl.
    *B60L 5/18*     (2006.01)
    *B60L 5/00*     (2006.01)

(58) Field of Classification Search
    CPC ...... B60L 5/22; B60L 5/28; B60L 5/30; B60L 5/32; B60L 5/36; B60L 5/38; B60L 5/39; B60L 5/40; B60L 2200/26; B60L 2200/36; B60L 2200/40; B60L 53/14
    See application file for complete search history.

(56) References Cited

U.S. PATENT DOCUMENTS

| | | | | |
|---|---|---|---|---|
| 3,804,996 | A * | 4/1974 | Monteith | B60L 5/38 |
| | | | | 191/1 R |
| 4,129,203 | A * | 12/1978 | Berman | B60L 5/36 |
| | | | | 104/145 |
| 4,476,947 | A | 10/1984 | Rynbrandt | |
| 5,180,041 | A * | 1/1993 | Shuto | B60L 5/38 |
| | | | | 191/53 |
| 5,531,301 | A * | 7/1996 | Makino | B60L 5/32 |
| | | | | 191/55 |
| 9,713,958 | B2 * | 7/2017 | Buehs | B60L 5/36 |
| 10,227,013 | B2 * | 3/2019 | Tajima | B60L 53/16 |
| 11,014,459 | B2 * | 5/2021 | Sebestyen | B60L 5/42 |
| 2006/0065501 | A1 * | 3/2006 | Taylor | B61D 7/30 |
| | | | | 191/49 |
| 2015/0041273 | A1 | 2/2015 | Klein et al. | |
| 2018/0290549 | A1 * | 10/2018 | Forsberg | B60L 53/126 |
| 2019/0210467 | A1 * | 7/2019 | Ohman | B60L 5/04 |

FOREIGN PATENT DOCUMENTS

| | | | |
|---|---|---|---|
| CN | 104169121 A | 11/2014 | |
| CN | 104943565 A | 9/2015 | |
| CN | 205034122 U | 2/2016 | |
| DE | 202005002376 U1 | 5/2005 | |
| DE | 102012202955 A1 | 8/2013 | |
| DE | 102012223068 A1 | 6/2014 | |
| EP | 3052704 A1 | 8/2016 | |
| FR | 2471299 A1 * | 6/1981 | ............... B60L 5/08 |
| FR | 2696985 A1 | 4/1994 | |
| GB | 2084096 A | 4/1982 | |
| JP | S55146501 | 10/1955 | |
| JP | S5769404 U | 4/1982 | |
| JP | 2000050406 A | 2/2000 | |
| WO | 2011123049 A1 | 10/2011 | |

OTHER PUBLICATIONS

Japan Office Action dated Jul. 31, 2020 in corresponding Japanese Application No. 2019-524151, 3 pages.
International Search Report dated Aug. 1, 2017 in International Application No. PCT/EP2016/077204.
Written Opinion dated Aug. 1, 2017 in International Application No. PCT/EP2016/077204.
European Office Action dated Nov. 10, 2021 in corresponding European Patent Application No. 16794603.7, 5 pages.
China Office Action dated Oct. 20, 2021 in corresponding China Patent Application No. 201680090753.3, 15 pages.

* cited by examiner

CURRENT COLLECTOR DEVICE FOR A VEHICLE

TECHNICAL FIELD

The invention relates to a current collector device for a vehicle using an electric road system (ERS) and a vehicle operated using this current collector device.

The invention can be applied in vehicles, such as trucks, buses and construction equipment. Although the invention will be described with respect to a commercial vehicle, the invention is not restricted to this particular vehicle, but may also be used in heavy-duty vehicles such as working machines in the form of articulated haulers, or a vehicle such as an automobile.

BACKGROUND

Vehicles travelling on an electric road system (ERS) are provided with a current collector device arranged to transmit electric power from a current conductor located in the road surface to the vehicle for driving the vehicle or for charging an electrical storage means, such as a high voltage battery onboard the vehicle. The current conductor is a charging surface that can comprise a pair of parallel tracks extending along the electric road, which tracks can supply direct current (DC) to the vehicle via the current collector arrangement.

Current collector devices usually comprise a retractable arm with an attached pick-up unit for deploying into an optimal position for charging for example by means of an actuator.

Actuators used for this purpose are quite different form actuators used in pantographs for overhead wires. Current collector devices for ERS vehicles must perform a controlled movement during deployment into contact with the current conductor while the vehicle is being driven. The current collector device must also be able to hold the pick-up unit in contact, or at least sufficient proximity during inductive charging, with the current conductor during power transmission to avoid arcing.

A further issue is that typical voltages and currents used in an ERS are large and electrical security and galvanic isolation is therefore paramount. However, there is also a desire to reduce the weight while making the current collector device more robust to reduce the force and power needed for the actuator providing the controlled movement. Moreover, there is also a desire to provide a more modular device as well as reducing the packaging space required for the device. Hence, a current collector device should preferably be electrically isolating, light weight, robust and modular.

SUMMARY

It is an object of the present invention to improve the current state of the art, to at least partly alleviate the above problems, and to provide an improved current collector device. The invention aims to provide an improved current collector device that can provide an improved electrical separation, have a lighter weight than current solutions, be more robust and/or be modular.

According to a first aspect of the invention, these and other objectives are at least partly met by a current collector device arranged for mounting on a vehicle to transmit electric power between current conductors located in the surface of a road and the vehicle, wherein the current collector device comprises:

- a base for connecting the current collector device to the vehicle;
- a first elongated current collector arm that is in operable connection with the base, and a second elongated current collector arm that is in operable connection with the base,
- wherein the first elongated current collector arm and the second elongated current collector arm are spaced apart from each other;
- a first current collector pick-up head attached to the first elongated current collector arm distally from the base and a second current collector pick-up head attached to the second elongated current collector arm distally from the base
- wherein the elongated current collector arms are made of an electrically conducting material and arranged to conduct electrical current from conductors located in the surface of a road and the vehicle.

The present invention is based on the realization that using a dual arm structure for the current collector device used to dynamically charge a vehicle on a conductive electrical road provides a light weight, modular and robust current collector device. By constructing the current collector device as an electrically separated dual structure of an electrically conducting material instead of a single mechanical structure where power cables are routed from the current collector pick-up head along an arm and into the vehicle electrical power system, it is possible to use the current collector arms as electrical conductors and thereby eliminate the need for power cables being routed all the way from the power collector shoes of the charging device where the environment is harsh. Due to the harsh environment below a vehicle, at least in a road surface charging system, the mechanical integrity is at risk from e.g. debris on the road and contaminants such as water, salt and other chemicals. Further, the current collector device is, by having two separate current collector arms, designed in a modular fashion which provides the advantage of being able to replace worn or damaged parts without having to replace the entire current collector device. Further, the inertia and weight distribution of the current collector device is improved as the weight of the power cables from the device can be removed from their attachment points at the current collector pick-up head. This also reduces the space needed by placing the power cable attachment point at the base of the current collector device instead of at the collector pick-up heads, and reduces the cost of power cables.

The elongated current collector arms and the pick-up heads are displaceable. For example via means of one or more actuators arranged on the vehicle, or mounted in connection with the base.

The first current collector pick-up head and the second current collector pick-up head may be spaced apart. The spacing between the first current collector pick-up head and the second current collector pick-up head may be in the range of 5 cm to 100 cm. This provides a good electrical isolation between the current collector pick-up heads.

The spacing between the elongated current collector arms may be in the range of 5 cm to 100 cm. This provides a good electrical isolation between the current collector arms.

That the elongated current collector arms are made of a conducting material should be interpreted as the elongated current collector arms being made of material having conductivity greater than $10^6$ Siemens/meter.

In the subsequent text the wording "electric road system" will be described by the abbreviation ERS. An ERS can encompass a conductive system or an inductive system. Conductive systems require direct contact between a conductor comprising two parallel rails and a corresponding collector in order to transfer DC power or AC power. Inductive systems uses electro-magnetic transmission coils embedded in the road surface and reception coils in the vehicle which are electrically resonant, so that they convert the magnetic flux above the road into electrical energy for use in the vehicle, wherein the energy can be used to charge batteries or drive electric motors in the vehicle.

In the text, the wording "current collector device" is used as a collective term for a device that is suitable for transferring electrical power from a source of electrical energy in or on a road surface. A current collector device of this type comprises two current collectors, also referred to as a current collector pick-up head or a current collector shoe. The current collectors are arranged to be placed in contact with current conductors, or in the case of inductive charging a correct placement above the tracks. The current collectors are typically attached to the vehicle via a controllable assembly that allows the current collector to be at least vertically and optionally also transversely displaced relative to the vehicle. The displacement can be achieved, for instance, by collector arms that can be pivoted vertically about a horizontal pivot joint towards the road surface and transversely in an arc about a vertical pivot joint, or by a holder displaced vertically along a first guide and transversely about a second guide mounted transversely to the vehicle. Consequently, when it is stated that the current collectors are displaced to track a current conductor, this intended to mean that the arrangement is displaced to allow the current collector components of the current collector arrangement to be placed at an optimal position relative current conductors. The term "current conductors" used in this context comprises two parallel rails or similar which are contacted by a pick-up unit comprising a pair of corresponding current conducting contact elements. Alternatively, the current conductor is approached by a pick-up unit which comprises the electronic components needed to receive energy inductively.

In at least one exemplary embodiment, the elongated current collector arms are parallel. Stated differently, the longitudinal axis of the first elongated current collector arm and the longitudinal axis of the first elongated current collector arm are parallel. Alternatively, the elongated current collector arms may not be parallel. The above meaning of parallel should be interpreted as relating to the distance between the elongated current collector arms as projected to a plane in which both the elongated current collector arms lie when raised to the same height. Stated more simply, the parallel elongated current collector arms means that the horizontal distance between points of the elongated current collector arms are constant along the length of the current collector arms, whereas if the elongated current collector arms are not parallel the distance between the elongated current collector arms varies along the length of the elongated current collector arms.

In one exemplary embodiment, the distance between the elongated current collector arms is smaller at the connection with the base and larger at the point at which the current collector pick-up head is attached. In another exemplary embodiment, the distance between the elongated current collector arms is larger at the connection with the base and smaller at the point at which the current collector pick-up head is attached.

In at least one exemplary embodiment, the first current collector pick-up head is formed integrally with the first elongated current collector arm, and the second current collector pick-up head is formed integrally with the second elongated current collector arm. By forming the current collector pick-up heads integrally with the elongated current collector arms there is a reduced need for attachment which could be affected by vibrations and the harsh environment.

In at least one exemplary embodiment, the first current collector pick-up head and second current collector pick-up head are formed as a single unit. Stated differently, the first current collector pick-up head and the second current collector pick-up head mechanically connect the first elongated current collector arm and the second current collector arm. This provides an increased stability for the current collector device.

In at least one exemplary embodiment, the first or second current collector pick-up head comprises at least one isolating element arranged to galvanically isolate the first elongated current collector arm and the second elongated current collector arm.

In at least one exemplary embodiment, the current collector device further comprises a stabilizing structure extending between the first elongated current collector arm and the second current collector arm. The stabilizing structure provides an increased stability and rigidity for the current collector device. The stabilizing structure may be made of an insulating material.

In at least one exemplary embodiment, the stabilizing structure comprises at least one isolating element arranged to galvanically isolate the first elongated current collector arm and the second elongated current collector arm. The stabilizing structure may be made of an insulating material, or an electrically conductive material.

In at least one exemplary embodiment, the first elongated current collector arm and the second elongated current collector arm comprises aluminum. For example, the elongated current collector arms may be made of aluminum or an aluminum alloy, and/or the elongated current collector arms may comprise copper. Aluminum is a light weight material having a high conductivity. It should of course be noted that the inventive concept may be used with any suitable material, such as a metal having conductivity in the same order of magnitude as aluminum or comprise grapheme and/or a conductive polymer.

In at least one exemplary embodiment, the first elongated current collector arm and the second elongated current collector arm are coated with a non-conductive coating. The coating may be made of a plastic material. The coating may be hydrophobic and or oleophobic to facilitate the removal of contaminants.

In at least one exemplary embodiment, the first elongated current collector arm and the second elongated current collector arm are arranged to be controllable for vertical and transverse displacement relative to the longitudinal axis of the vehicle separately, and the current collector device further comprises at least one actuator arranged to effect a vertical or transverse displacement of the first current collector pick-up head and the second current collector pick-up head separately.

In at least one exemplary embodiment, the first elongated current collector arm and the second elongated current collector arm are arranged to be controllable for vertical and transverse displacement relative to the longitudinal axis of the vehicle together, and the current collector device further comprises at least one actuator arranged to effect a vertical or transverse displacement of the first current collector pick-up head and the second current collector pick-up head.

The present invention also relates to a vehicle comprising a current collector device as described above. Although the invention will be described with respect to a commercial vehicle, such as a truck or a bus, the invention is not restricted to this particular vehicle, but may also be used in a heavy-duty vehicle or in construction equipment, such as a working machine in the form of an articulated hauler, or a vehicle such as an automobile.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

In the following text, the invention will be described in detail with reference to the attached drawings. These schematic drawings are used for illustration purposes only and do not in any way limit the scope of the invention. In the drawings.

DETAILED DESCRIPTION OF EXAMPLE EMBODIMENTS OF THE INVENTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

First, the general teachings of current collector devices will be explained with reference to FIGS. 1, 2 and 3. Thereafter, embodiments of the present invention will be described with reference to FIGS. 3-6.

Figure 1:
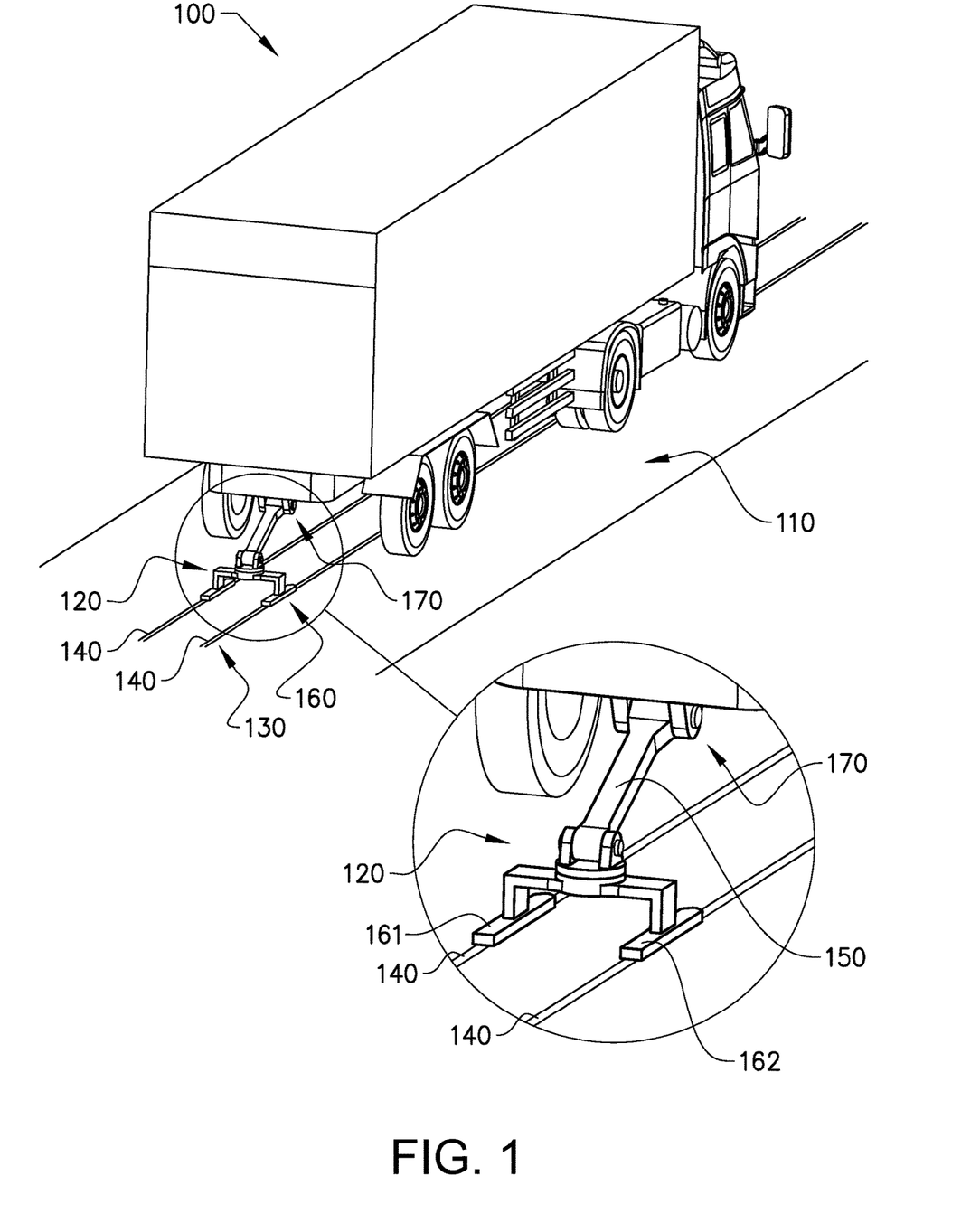
FIG. 1 shows a schematic vehicle comprising a current collector device travelling on an electric road system.

FIG. 1 shows a schematic electric road system (ERS) where a vehicle 100 is travelling on a road 110 provided with a current conductor 130 for supplying electric current to the vehicle 100. The vehicle 100 is provided with a conductive current collector device 120, which can be lowered into contact with the current conductor 130 comprising parallel current conducting rails 140 located in the surface of the road 110. The vehicle can be an electric vehicle or a hybrid electric vehicle.

The current collector device 120 comprises a base 170 connecting and attaching the current collector device 120 to the chassis structure of the vehicle 100, an elongated current collector arm 150 arranged to be displaced between a retracted, inactive first position and an operative second position. In use, the current collector arm 150 and a pick-up unit 160 is lowered into contact with the current conductor 130 using suitable actuators (not shown). The actuator(s) may be arranged in the base 170 of the current collector device 120. The pick-up unit 160 has a pair of contact elements 161, 162. FIG. 1 shows the current collector arm 150 in its operative position. Suitable actuators are provided for moving the current collector arm 150 at least in the vertical direction of the vehicle 100. Note that the current collector pick-up head 160 is attached to the elongated current collector arm 150 distally from the base 170. In other words, the current collector pick-up head 160 and the base 170 are arranged at opposite ends of the elongated current collector arm 150. Furthermore, the current collector device comprises power cables (not illustrated) connected to the contact elements 161, 162 for transporting electrical current from the contact elements 161, 162 to the electrical power system of the vehicle.

In this context the current collector device will be described as comprising a displaceable current collector arm for the pick-up unit, which arm can be displaced vertically either in a straight line or in an arcuate path relative to a pivot with a horizontal axis on the vehicle. The positioning means for such an arm can also comprise actuator means for displacing the arm in the transverse direction of the vehicle, either in a transverse straight line or in an arcuate path relative to a pivot with a vertical axis on the vehicle. Alternatively, the transverse positioning means can comprise suitable control means connected to an electronically controllable steering system in the vehicle, wherein lateral positioning of the vehicle relative to the electrical conductor can be performed using a pair of steerable wheels. Positioning can further be performed using a combination of the above means, for instance if the vehicle must be displaced in the lateral direction to bring the current conductor within the transverse range of the displaceable arm carrying the current collector. The design of the current collector device is described in further detail below.

Figure 2:
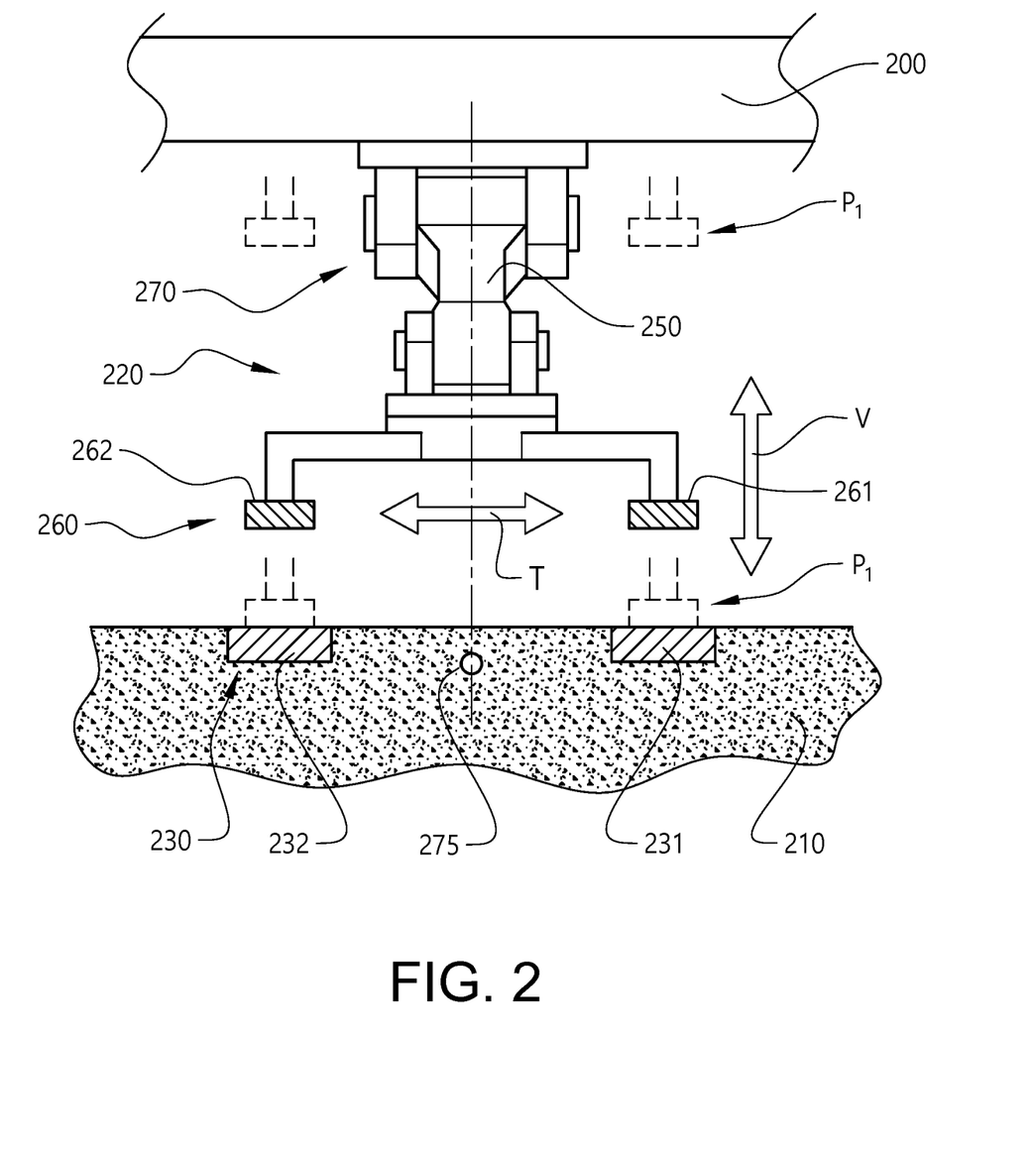
FIG. 2 shows a schematic front view of a current collector device.

FIG. 2 shows a schematic front view of a current collector device 220. The current collector device 220 is mounted on a schematically indicated vehicle 200 located over a schematic section of a road 210. A current conductor 230 comprising a first and a second power rail 231, 232 for supplying DC current is located in the surface of the road 210. The current collector arrangement 220 comprises a current collector arm 250 and a pick-up unit 260 with a pair of contact elements 261, 262 for collecting current from the respective first and second power rails 231, 232. The current collector arm 250 is attached to a vertical positioning means (not shown) for displacing the current collector arm 250 from a retracted first position P1 adjacent the vehicle 200 to an active second position P2 in contact with the current conductor 230. The vertical displacement is indicated by the arrow V. The lowering of the current collector arm 250 into the active, second position is performed when its detected that the first and second contact elements 261, 262 are vertically aligned with their respective first and second power rails 231, 232. Alternatively, a movement towards the second active position may be begun when a current conductor is detected and then be steered towards an optimal horizontal position. The current collector arm 250 is attached to the vehicle 200 via a horizontal positioning means 270 for displacing the current collector arm 250 in a transverse direction.

In FIG. 2 the current collector arm 250 is shown in an intermediate position during displacement towards the second position P2. Prior to lowering the current collector arm 250 into the second position P2 it is necessary to locate and track the current conductor 230. According to the example in FIG. 2, locating and tracking the current conductor 230 can be performed by using one or more vertical antennas (not shown) used for detecting the position of a signal cable 275 located between or adjacent the current conductor 230. However, the invention is not limited to this method of locating the current conductor.

In the example shown in FIG. 2, the current collector arm 250 and the vertical positioning means are attached to a transverse positioning means 270. The vertical positioning means is arranged to displace the current collector arm 250 and the pick-up unit 260 in the vertical direction of the vehicle 200 as indicated by the arrow V. The horizontal positioning means 270 is arranged to displace the current collector arm 250 and the pick-up unit 260 in the transverse direction of the vehicle 200 as indicated by the arrow T. The transverse positioning means 270 is controlled to displace the current collector arm 250 in the transverse direction of the vehicle 200, initially to locate and subsequently to track the current conductor 230. Tracking is performed to maintain the first and second contact elements 261, 262 in vertical alignment with their respective first and second power rails 231, 232.

Figure 3:
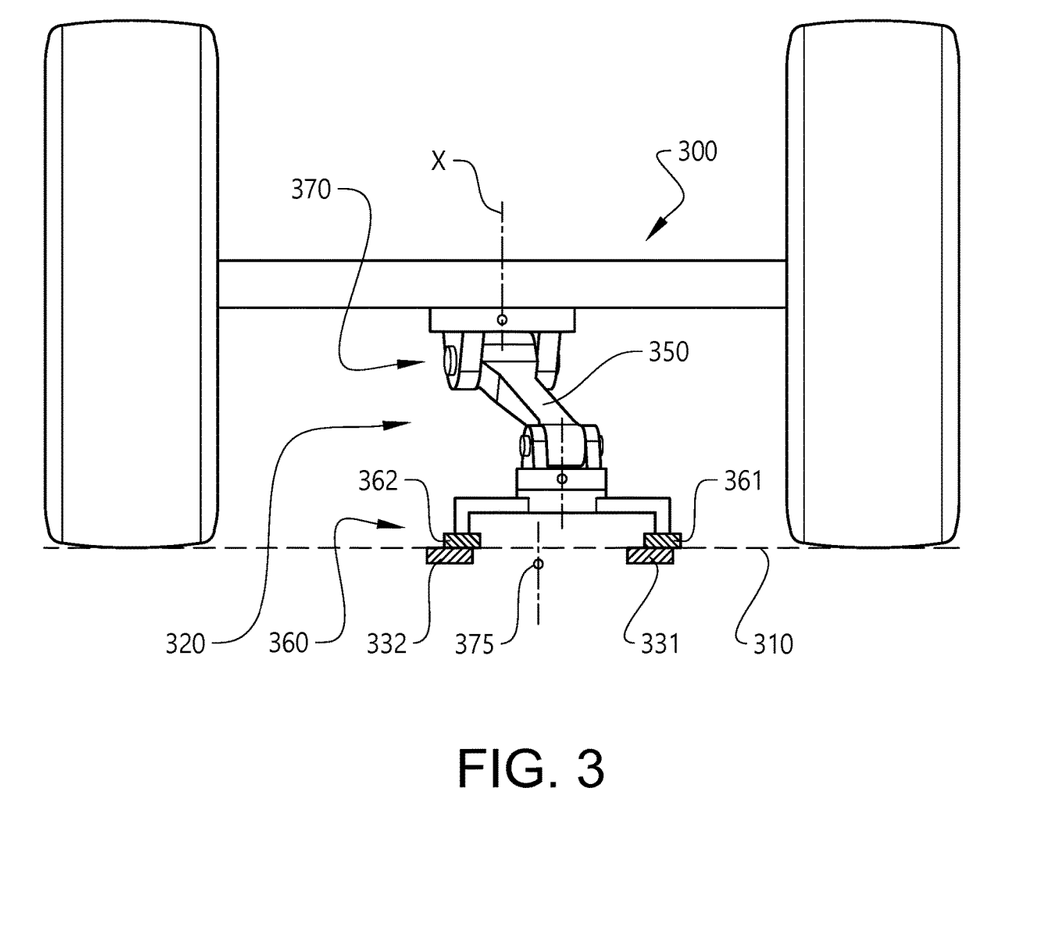
FIG. 3 shows a schematic front view of an alternative current collector device.

FIG. 3 shows a schematic front view of an alternative current collector device 320. The current collector device 320 is mounted on a vehicle 300 located over a section of a road 310. A current conductor 330 comprising a first and a second power rail 331, 332 for supplying DC current is located in the surface of the road 310. The current collector arrangement 320 comprises a current collector arm 350 and a pick-up unit 360 with a pair of contact elements 361, 362 for collecting current from the respective first and second power rails 331, 332. The current collector arm 350 is attached to a vertical positioning means (not shown) for displacing the current collector arm 350 from a retracted first position adjacent the vehicle 300 to an active second position (indicated in the figure) in contact with the current conductor 330. The lowering of the current collector arm 350 into the active, second position is performed when its detected that the first and second contact elements 361, 362 are vertically aligned with their respective first and second power rails 331, 332. Alternatively, a movement towards the second active position may be begun when a current conductor is detected and then be steered towards an optimal horizontal position. The current collector arm 250 is attached to the vehicle 300 via a pivoting means 370 for displacing the current collector arm 250 about a vertical axis X. During this displacement the pick-up unit 360 is moved along an arcuate path relative to the vertical axis X on the vehicle 300.

In reference to the above, and in general with regard to current collector devices; The current conductor is preferably, but not necessarily located in a predetermined transverse position in the longitudinal direction of the road surface. The vehicle is provided with means (not shown) for detecting and/or locating the position of the current conductor relative to the vehicle and/or suitable road markers on or along the road. The current collector device comprises a displaceable current collector arm that is arranged to be controllable for vertical and transverse displacement relative to a longitudinal axis of the vehicle, either via linear movement or arcuate movement. The longitudinal axis of the vehicle extends in the main direction of forward movement of the vehicle. A vertical downwards displacement is performed in order to place a pick-up unit comprising contact elements mounted on a free end of the current collector arm into an optimal charging position, in order to effect transmission of current. A vertical upwards displacement is performed in order to retract the current collector arm, when the current transmission has been interrupted. The current collector arrangement may comprises controllable actuator(s), mounted in the base, arranged to effect the vertical displacement the current collector arm and an electronic control unit (not shown) for controlling at least power transmission in and displacement of the current collector arm. The control unit is arranged to detect when the vehicle enters or leaves an ERS road and to initiate the power transmission after a completed deployment of the current collector arm and to interrupt the power transmission prior to retraction of the current collector arm.

Hence, in operation, it is first determined that the vehicle has entered an ERS road and that the current collector arm should be moved from the retracted position into the deployed position in contact with a current conductor. A signal is transmitted to the ECU which will in turn transmit signals to the actuator(s) causing the current collector arm to be deployed downwards. When the current collector arm reaches its end position in contact with a current conductor, the pressure applied by the actuator(s) will cause a downward force ensuring a sufficient contact force with the conductor.

Subsequently, it can be determined that the vehicle is about to leave the ERS road and that the current collector arm should be moved from the deployed position into the retracted position. Alternatively, a retraction can also be initiated if an obstacle is detected on the conductor, requiring retraction of the control arm or evasive action of the vehicle. A signal is transmitted to the ECU which in turn transmits signals to the actuator(s) causing the current collector arm to be retracted upwards. When the current collector arm reaches its retracted position adjacent the vehicle, the ECU transmits signals to halt the operation of the actuator(s).

Figure 4A:
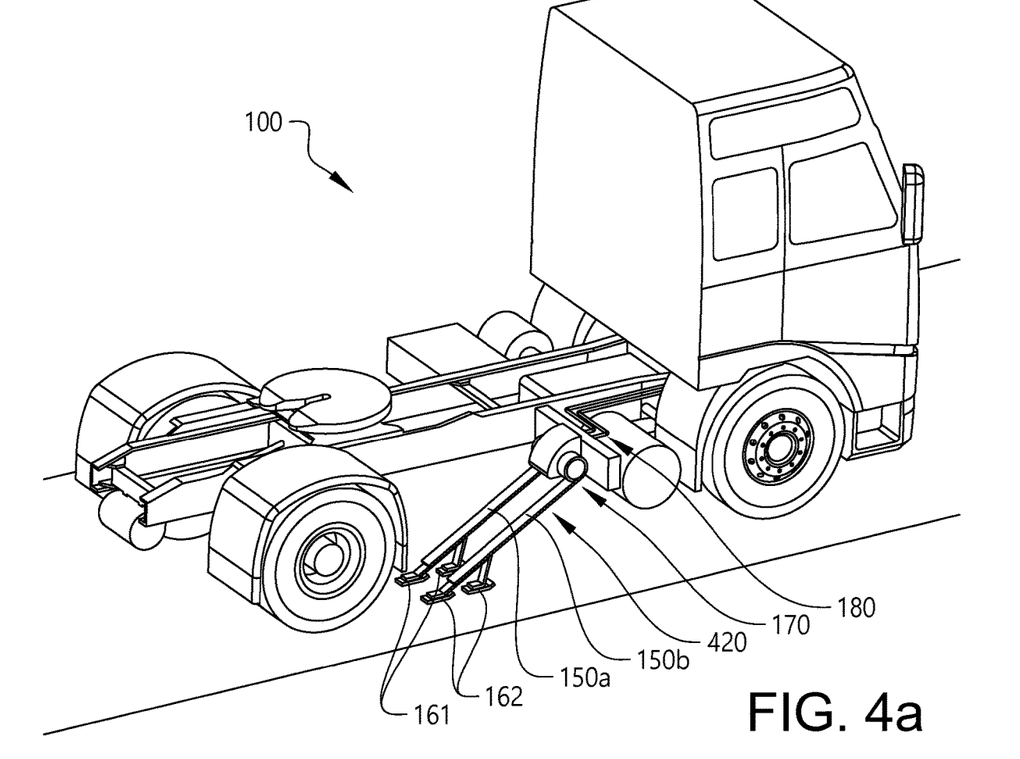
FIG. 4a shows a schematic isometric view of a current collector device according to an embodiment of the invention attached to a vehicle.

FIG. 4a shows an isometric view of an exemplary embodiment of a current collector device 420 according to the invention, for the sake of brevity the current collector device 420 is for all intents and purposes similar in function with regard to activation and displacement as the current collector devices described above in conjunction with FIGS. 1, 2 and 3. The purpose remains the same; to transmit electric power between current conductors located in the surface of a road and a vehicle onto which the current collector device is mounted.

The current collector device 420 comprises a base 170, a first and second elongated current collector arm 150a, 150b, a first current collector pick-up head 161 attached to the first elongated current collector arm 150a, and a second current collector pick-up head 162 attached to the second elongated current collector arm 150b distally from the base 170.

The first elongated current collector arm 150a is spaced apart from the second elongated current collector arm 150b by the distance d. The distance d may be in the range of 5 cm to 100 cm. Typically, the distanced d is in the smaller range of 15 cm to 45 cm. The length of the elongated current collector arms 150a, 150b may be in the range of 50 cm to 200 cm. Typically, the length of the elongated current collector arms 150*a*, 150*b* are in the range of 75 cm to 150 cm.

The elongated current collector arms 150*a*, 150*b* are made of an electrically conductive material. The base 170 may be attachable to a vehicle 100 as shown in FIG. 4*a*. The elongated current collector arms 150*a*, 150*b* extend from the base 170 to a respective free end of the elongated current collector arms 150*a*, 150*b*. The first current collector pick-up head 161 is attached towards the free end of the first elongated current collector arm 150*a*, and the second current collector pick-up head 162 is attached towards the free end of the second elongated current collector arm 150*b*. Stated differently, the elongated current collector arms 150*a*, 150*b* are connected and attached at a first end to the base 170, at the second end of the elongated current collector arms 150*a*, 150*b*, opposite to the first end, the current collector pick-up heads 161, 162 are attached. The second end of the elongated current collector arms 150*a*, 150*b* is free to be displaced as described above in conjunction with FIGS. 1, 2 and 3. Hence, the current collector pick-up heads 161, 162 are attached to the elongated current collector arms 150*a*, 150*b* distally from the base 170. The elongated current collectors arms 150*a*, 150*b* are arranged to conduct electrical current from conductors located in the surface of a road and the vehicle 100. The elongated current collector arms may be made of a lightweight and strong material, such as aluminium.

The elongated current collector arms 150*a*, 150*b* may also comprise a non-conductive coating (not illustrated) to protect the elongated current collector arms 150*a*, 150*b* from the harsh conditions below a vehicle. The coating is preferably electrically isolating. The coating may be hydrophobic and or oleophobic to facilitate the removal of contaminants on the surface of the elongated current collector arms.

Figure 4B:
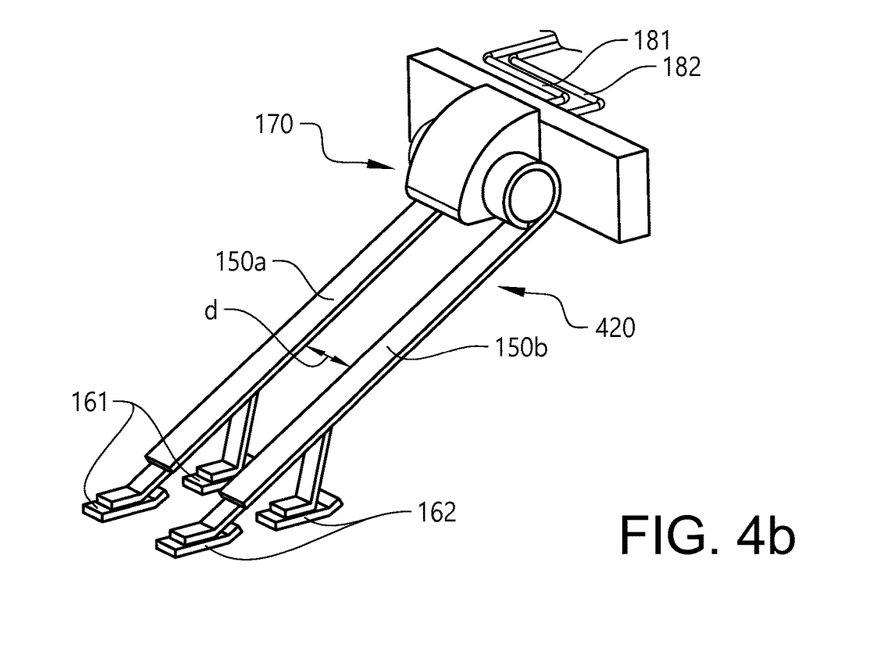
FIG. 4b shows a schematic isometric view of the current collector device of FIG. 4a isolated from the vehicle.

The first and second current collector pick-up heads 161, 162 are illustrated in FIGS. 4*a* and 4*b* as being formed integrally with the respective elongated current collector arm. By forming the current collector pick-up heads integrally with the elongated current collector arms 150*a*, 150*b* there is a reduced need for attachment which could be affected by vibrations and the harsh environment. The first and second current collector pick-up heads 161, 162 are also shown comprising two parts, a back part being arranged further towards the free end of the elongated current collector arm than a front part. The spacing between the back part and front part may be in the range of 5 cm to 75 cm. The separation enables the current collector device to bridge a gap between two sections of conductors in the road of the ERS.

Figure 5A:
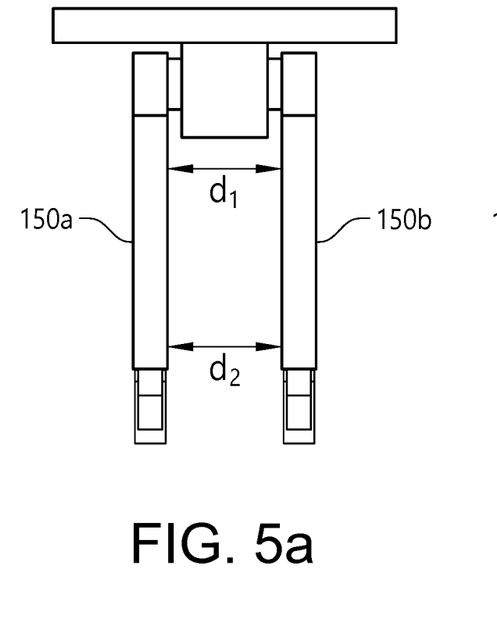
FIGS. 5a-c shows schematic top down views of current collector devices according to various embodiments of the invention.
Figure 5B:
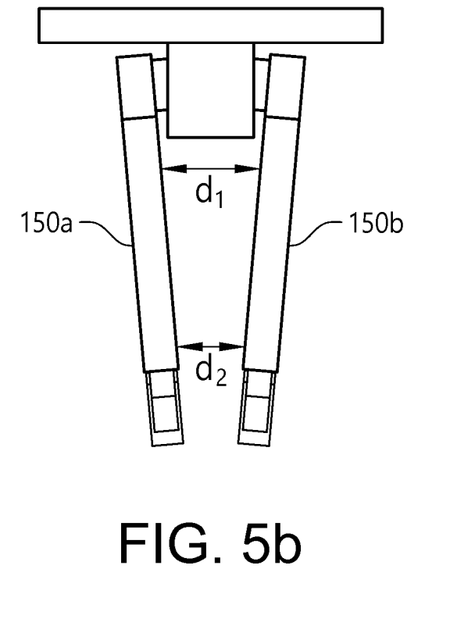
Figure 5C:
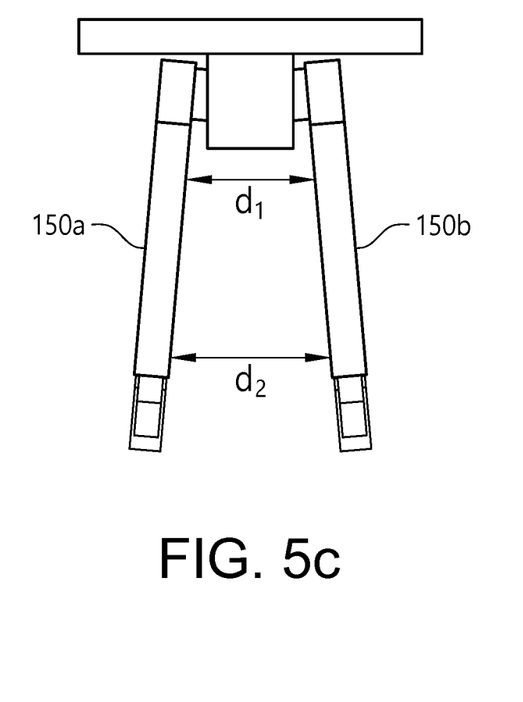

FIGS. 5*a-c* are top down schematic view of embodiments of a current collector device in accordance with the inventive concept. FIG. 5*a* shows a current collector device where the distance d1, between the elongated current collector arms 150*a*, 150*b*, at the first end of the elongated current collector arms and the distance d2 between the free ends of the elongated current collector arms are essentially equal. Hence, FIG. 5*a* illustrates an embodiment where the elongated current collector arms 150*a*, 150*b* are parallel.

FIG. 5*b* shows a current collector device where the distance d1, between the elongated current collector arms 150*a*, 150*b*, at the first end of the elongated current collector arms is larger than the distance d2 between the free ends of the elongated current collector arms. FIG. 5*c* shows a current collector device where the distance d1, between the elongated current collector arms, at the first end of the elongated current collector arms is smaller than the distance d2 between the free ends of the elongated current collector arms.

The distances d1 and d2 may be the range of 5 cm to 100 cm.

Figure 6A:
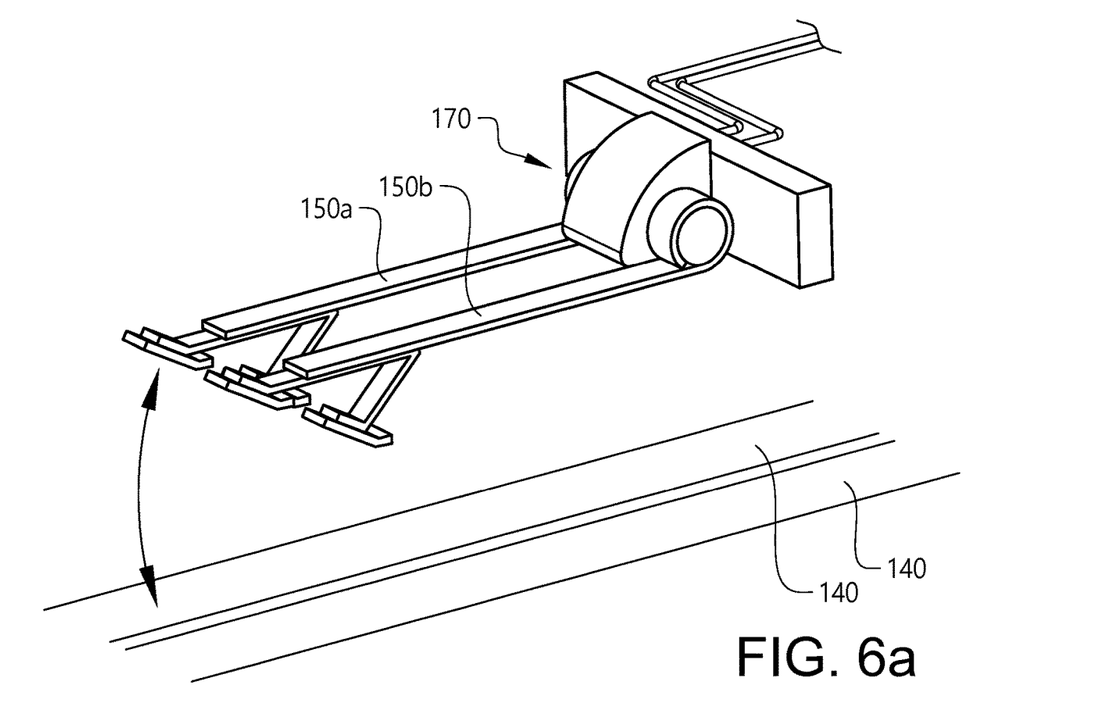
FIGS. 6a and 6b shows a schematic isometric view of current collector devices according to various embodiments of the invention.
Figure 6B:
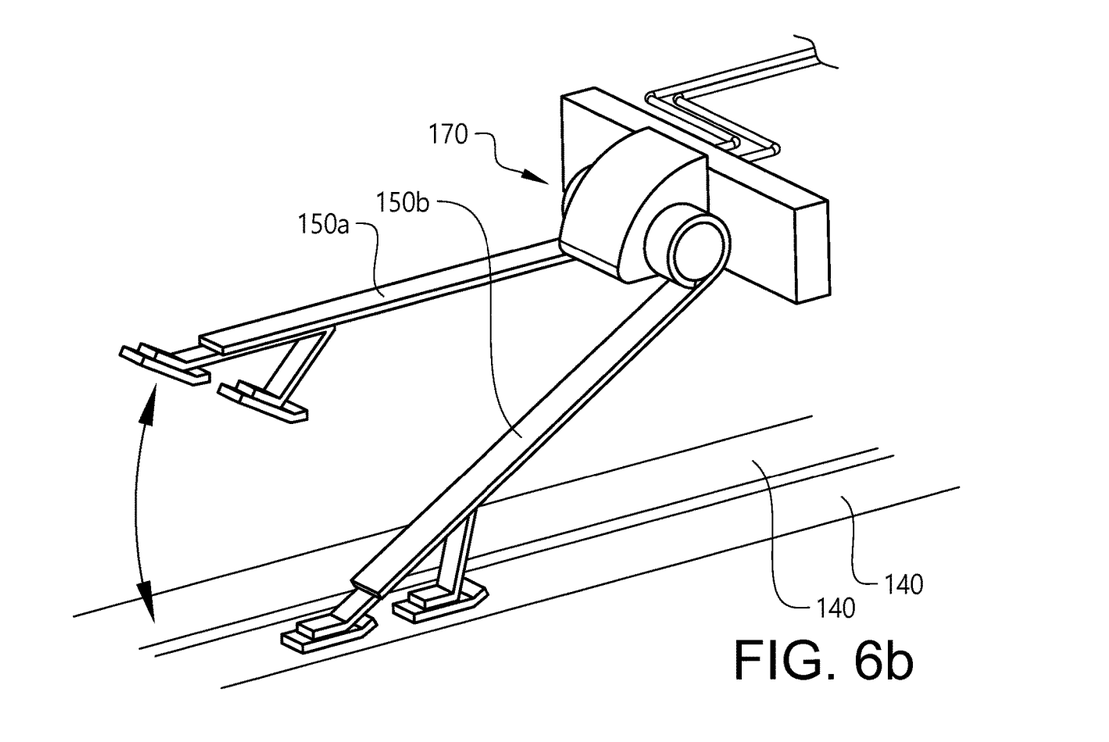

FIGS. 6*a* and 6*b* shows two different embodiments of a current collector device according to the inventive concept. FIG. 6*a* illustrates an embodiment where the elongated current collector arms 150*a*, 150*b* are displaceable together. Hence, the current collector device further comprises a control unit (not shown) and suitable actuators (not shown), for example arranged in the base 170 for displacing the elongated current collector arms 150*a*, 150*b* such that the pick-up heads 160 are placed in an optimal position as described above in connection to FIGS. 1-3.

FIG. 6*b* illustrates an embodiment wherein the first and second elongated current collector arms 150*a*, 150*b* are individually displaceable. Hence, the current collector device further comprises a control unit (not shown) and suitable actuators (not shown), for example arranged in the base 170 for displacing the elongated current collector arms 150*a*, 150*b* individually such that the pick-up heads 160 are placed in an optimal position as described above in connection to FIGS. 1-3. By separately displacing the elongated current collector arms 150*a*, 150*b* debris only located on one conductor may be avoided by only lifting one elongated current collector arm. Moreover, the current collector device may be adapted to ERS having different widths between the conductors located in the road.

Although FIGS. 6*a* and 6*b* only show vertical combined and separate displacement, it is of course also possible to include suitable actuators (not shown) for combined and/or separate horizontal displacement of the first and second elongated current collector arms 150*a*, 150*b*.

Figure 7A:
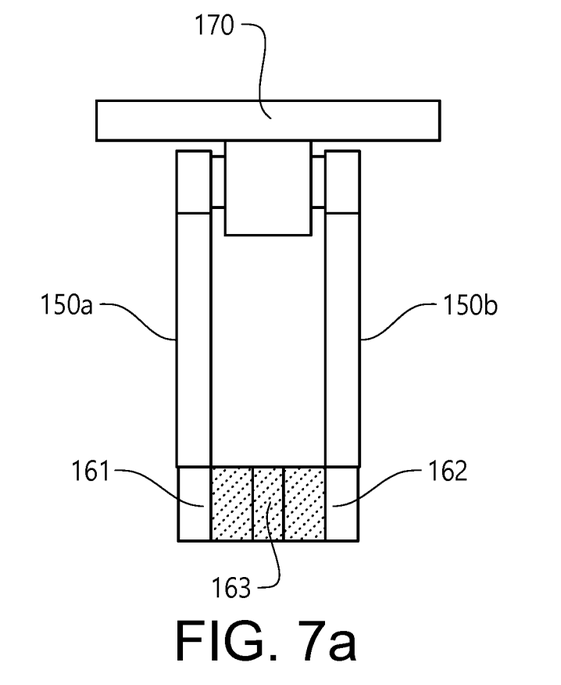
FIGS. 7a and 7b shows schematic top down views of current collector devices according to various embodiments of the invention.
Figure 7B:
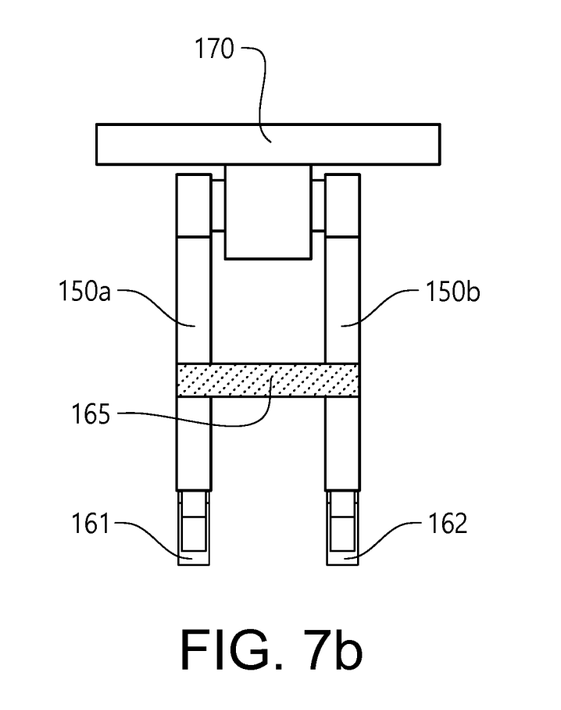

FIGS. 7*a* and 7*b* is a top-down view showing two embodiments of a current collector device 420 according to the inventive concept. In FIG. 7*a* the current collector device the current collector pick-up heads are attached to each other to form a single pick-up head in order to stabilize the current collector device. The current collector device further comprises an isolating element 163 arranged between the pick-up heads 161, 162. The pick-up heads 161, 162 may be provided as a single unit, which is then attached to the elongated current collector arms 150*a*, 150*b*. The isolating element 163 is arranged to galvanically isolate between the two elongated current collector arms 150*a*, 150*b*. The isolating element 163 may be made of plastic.

In FIG. 7*b* the current collector device further comprises a stabilizing structure 165 extending between the elongated arms and connecting them in order to stabilize the current collector device. The stabilizing structure may be made of a non-conductive material. Alternatively, the stabilizing structure may comprise an isolating element (not illustrated) in the same manner as the isolating element 163, in order to galvanically isolate the elongated current collector arms 150*a*, 150*b* from each other. Such an isolating element may be made of plastic. The stabilizing structure 165 may be able to flex, or have joints (not illustrated) connected to the elongated current collector arms 150*a*, 150*b* such that the elongated current collector arms 150*a*, 150*b* may be displaced individually as described in conjunction with FIG. 6*a*.

It should of course be noted that the embodiments of FIG. 7*a* and FIG. 7*b* may be combined such that the current collector device comprises both a stabilizing structure and a single pick-up head.

It is noted that throughout the drawings the elongated current collector arms 150a, 150b are shown having a thin and wide cross section. In principle the elongated current collector arms may have any cross sectional shape and are not limited to the embodiments shown herein, in particular the shape may be may be rectangular, square, circular, polygonal.

Moreover, the specific and exemplary material and attachment options described in conjunction to FIG. 4 is understood to be applicable to all the embodiments of a current collector device described in FIGS. 5-7. The coating described in conjunction to FIG. 4 is of course also applicable for all the embodiments described in FIGS. 5-7 and is only left out for the sake of brevity.

It is understood that the present invention is not limited to the embodiments described above and illustrated in the drawings; rather, the skilled person will recognize that many changes, variants and modifications may be made within the scope of the appended claims.

The invention claimed is:

1. A current collector device arranged for mounting on a vehicle to transmit electric power between current conductors located in the surface of a road and the vehicle, wherein the current collector device comprises:
   - a base for connecting the current collector device to the vehicle;
   - a first elongated current collector arm that is in operable connection with the base, and a second elongated current collector arm that is in operable connection with the base;
   - wherein the first elongated current collector arm and the second elongated current collector arm are spaced apart from each other;
   - a first current collector pick-up head attached to the first elongated current collector arm distally from the base; and
   - a second current collector pick-up head attached to the second elongated current collector arm distally from the base, wherein the first current collector pick-up head and the first elongated current collector arm are electrically separated from the second current collector pick-up head and the second elongated current collector arm;
   - wherein the elongated current collector arms are entirely made of an electrically conducting material and arranged to conduct electrical current from conductors located in the surface of a road and the vehicle, and
   - wherein the first elongated current collector arm and the second elongated current collector arm are arranged to be controllable for vertical and transverse displacement relative to the longitudinal axis of the vehicle separately, and the current collector device further comprises at least one actuator arranged to effect a vertical and transverse displacement of the first current collector pick-up head and the second current collector pick-up head separately.

2. A current collector device according to claim 1, wherein the elongated current collector arms are parallel.

3. A current collector device according to claim 1, wherein the first current collector pick-up head is formed integrally with the first elongated current collector arm, and wherein the second current collector pick-up head is formed integrally with the second elongated current collector arm.

4. A current collector device according to claim 1, wherein the first current collector pick-up head and second current collector pick-up head are formed as a single unit.

5. A current collector device according to claim 4, wherein the first or second current collector pick-up head comprises at least one isolating element arranged to galvanically isolate the first elongated current collector arm and the second elongated current collector arm.

6. A current collector device according to claim 1, further comprising a stabilizing structure extending between the first elongated current collector arm and the second current collector arm.

7. A current collector device according to claim 6, wherein the stabilizing structure comprises at least one isolating element arranged to galvanically isolate the first elongated current collector arm and the second elongated current collector arm.

8. A current collector device according to claim 1, wherein the first elongated current collector arm and the second elongated current collector arm comprises aluminum.

9. A current collector device according to claim 1, wherein the first elongated current collector arm and the second elongated current collector arm are coated with a non-conductive coating.

10. A current collector device according to claim 1, wherein the first elongated current collector arm and the second elongated current collector arm are arranged to be controllable for vertical and transverse displacement relative to the longitudinal axis of the vehicle together, and the current collector device further comprises at least one actuator arranged to effect a vertical or transverse displacement of the first current collector pick-up head and the second current collector pick-up head.

11. A vehicle comprising a current collector device according to claim 1.

* * * * *